United States Patent
Oosaki et al.

(10) Patent No.: US 8,120,837 B2
(45) Date of Patent: Feb. 21, 2012

(54) DISPLAY MEDIA PARTICLES AND INFORMATION DISPLAY PANEL USING THE SAME

(75) Inventors: Toshiyuki Oosaki, Kodaira (JP); Hideo Ishigouoka, Higashikurume (JP); Norihiko Kaga, Kodaira (JP); Kentaro Hanzawa, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/744,289

(22) PCT Filed: Aug. 5, 2009

(86) PCT No.: PCT/JP2009/063891
§ 371 (c)(1),
(2), (4) Date: May 21, 2010

(87) PCT Pub. No.: WO2010/016529
PCT Pub. Date: Feb. 11, 2010

(65) Prior Publication Data
US 2010/0245983 A1 Sep. 30, 2010

(30) Foreign Application Priority Data
Aug. 5, 2008 (JP) ................. 2008-201940

(51) Int. Cl.
*G02B 26/00* (2006.01)
(52) U.S. Cl. ........................ 359/296
(58) Field of Classification Search ........ 359/290–296
See application file for complete search history.

(56) References Cited

U.S. PATENT DOCUMENTS
7,236,291 B2 * 6/2007 Kaga et al. ............ 359/296

FOREIGN PATENT DOCUMENTS
| JP | 2006-064815 A | 3/2006 |
| JP | 2006-072283 A | 3/2006 |
| JP | 2006-106596 A | 4/2006 |
| JP | 2007-217651 A | 8/2007 |
| JP | 2008-083266 A | 4/2008 |
| JP | 2008-129322 A | 6/2008 |

OTHER PUBLICATIONS

Notice of Preliminary Rejection, mailed Oct. 27, 2011, as received from the Korean Intellectual Property Office in counterpart Korean Patent Application No. 10-2010-7012191 (along with English translation).

* cited by examiner

*Primary Examiner* — Ricky Mack
*Assistant Examiner* — Vipin M Patel
(74) *Attorney, Agent, or Firm* — Sughrue Mion, PLLC

(57) ABSTRACT

A display media particle used for an information display panel having display media constituted of particles sealed between two substrates, at least one of which is transparent, for displaying information by moving the display media, is formed of a mother particle 32 made from materials including a base resin having child particles 33 added to a surface thereof. The base resin is a thermoplastic resin having a viscosity of no more than 1000 Pa·s at 260° C. and a shear rate at 122 s$^{-1}$, and a heatproof temperature at no less than 430° C. Since optimal conditions of the viscosity and the heatproof temperature are specified, it is possible to round the resin effectively by a heat treatment for spheronization as a post-treatment after manufacturing.

2 Claims, 8 Drawing Sheets

FIG. 6
(a)
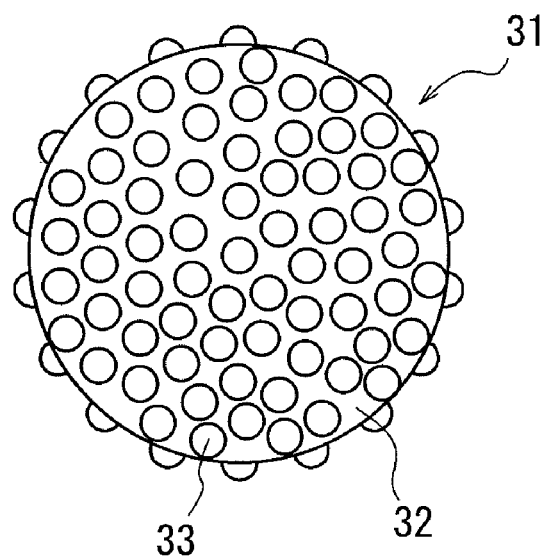
(b)
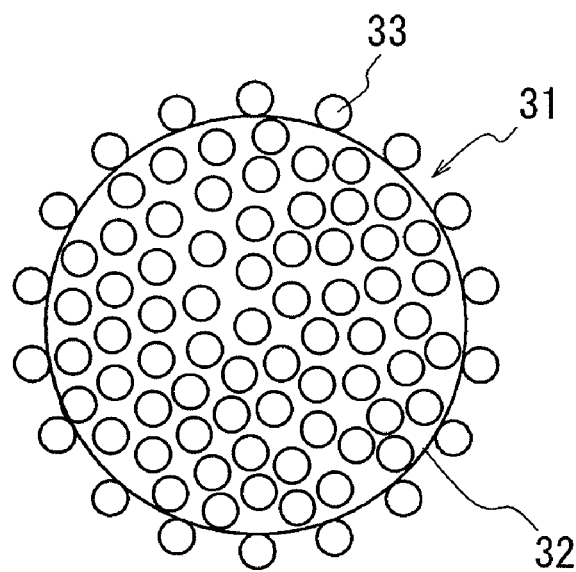

DISPLAY MEDIA PARTICLES AND INFORMATION DISPLAY PANEL USING THE SAME

CROSS REFERENCE TO RELATED APPLICATIONS

This application is a National Stage of International Application No. PCT/JP2009/063891 filed Aug. 5, 2009, claiming priority based on Japanese Patent Application No. 2008-201940, filed Aug. 5, 2008, the contents of all of which are incorporated herein by reference in their entirety.

TECHNICAL FIELD

The present invention relates to an information display panel having display media constituted of particles sealed between two substrates, at least one of which is transparent, for displaying information such as an image by moving the display media, and more specifically, to display media particles constituting the display media.

RELATED ART

A liquid crystal display (LCD) has been widely spread as an information display device. However, the liquid crystal display used to be known as generally having defects such as a great amount of power consumption and a narrow view angle. Therefore, as an alternative to the liquid crystal display, there is suggested an information display panel having a plurality of cells divided by partition walls between two substrates (glass substrates, for example), at least one of which is transparent, and containing the display media constituted of the particles in the cells, for displaying the information such as the image by moving the display media.

The information display panel stated above displays the information such as an desired image by electrically moving the display media between the substrates in accordance with the information of the image, for example. The particles (display media particles) repeatedly moves in a space between the substrates in accordance with information required to be displayed. Hence, it is required for the display media particles constituting the display media to be homogenous and durable.

In order to improve stabilization of electrical characteristics and durability of the display media particles for repetitive rewrite of a display, there is suggested an art of so-called compound particles in which a large particle as a mother particle has other fine particles attached thereto. For example, Patent Document 1 discloses compound display media particles in which the mother particle has child particles attached to a surface thereof and an information display panel using the compound media particles. With a configuration of the mother particle having the child particles under certain conditions attached thereto, it is possible to improve durability for repetitive movement of the display media particles for rewriting the display.

Patent Document 1: Japanese Patent Laid-Open Publication No. 2006-72283

SUMMARY OF THE INVENTION

Problems to be Solved by the Invention

In production of the compound particles described above, however, it is difficult to evenly attach or adhere the child particles to the surface of the mother particle. The child particles are generally attached to the surface of the mother particle in an embedding process or an adhering process after production of the mother particle. However, it often happens that the mother particle is distorted in shape (has an irregular shape) in a manufacturing process thereof. In such a case, the child particles cannot be arranged evenly on the surface of the mother particle. As a result, even the compound particles cannot always fulfill expectations on stabilization of the electrical characteristics and durability for repetitive rewrite of the display.

It is an object of the present invention to solve the above problems and provide the compound display media particles, in which the mother particles have the child particles evenly arranged on the surfaces thereof, and the information display panel using the compound display media particles.

Solution for the Problems

In order to achieve the above object, a display media particle used for an information display panel having display media constituted of particles sealed between two substrates, at least one of which is transparent, for displaying information by moving the display media, characterized in that the display media particle is formed of a compound particle in which a mother particle formed of a material including a base resin has child particles attached to a surface thereof, and the base resin is a thermoplastic resin having a viscosity of no more than 1000 Pa·s at 260° C. and a shear rate at $122\ s^{-1}$, and a heatproof temperature at no less than 430° C. and is a resin or a mixture of two or more resins selected from a group including methacrylate resin, polystyrene resin, polycarbonate resin, methylpentene resin and cycloolefin polymer resin. It is to be noted that cycloolefin polymer resin includes both cycloolefin polymer (COP) and cycloolefin copolymer (COC), here.

In addition, the above object can be achieved by an information display panel using the particles including the display media particle as the display media.

Effects of the Invention

According to the present invention, since optimum conditions of the viscosity and the heatproof temperature are specified for the base resin used for the mother particle of the compound particle, it is possible to round (spheronize) the mother particle efficiently by a heat treatment for spheronization as a post-treatment after manufacturing. The mother particle with high circularity can attach the child particles evenly to the surface thereof, which can thereby provide compound display media particles with durability. By using such display media particles, it is possible to provide the information display panel excellent in stabilization of electrical characteristics and durability for repetitive rewrite of the display.

The conditions necessary for the base resin of the mother particle is lower viscosity (less viscosity) and higher heat resistance. With the thermoplastic resin presently available, the conditions are specified in particular as the viscosity of no more than 1000 Pa·s at 260° C. and the shear rate at $122\ s^{-1}$, and the heatproof temperature, defined at a point of 20% reduction from an initial weight indicated by a thermal weight reduction curve by means of a thermogravimetry unit, at no less than 430° C.

BRIEF DESCRIPTION OF THE DRAWINGS

FIGS. 6a and 6b are diagrams schematically illustrating examples of a complex display media particle;

BEST MODE FOR CARRYING OUT THE INVENTION

Figure 1:
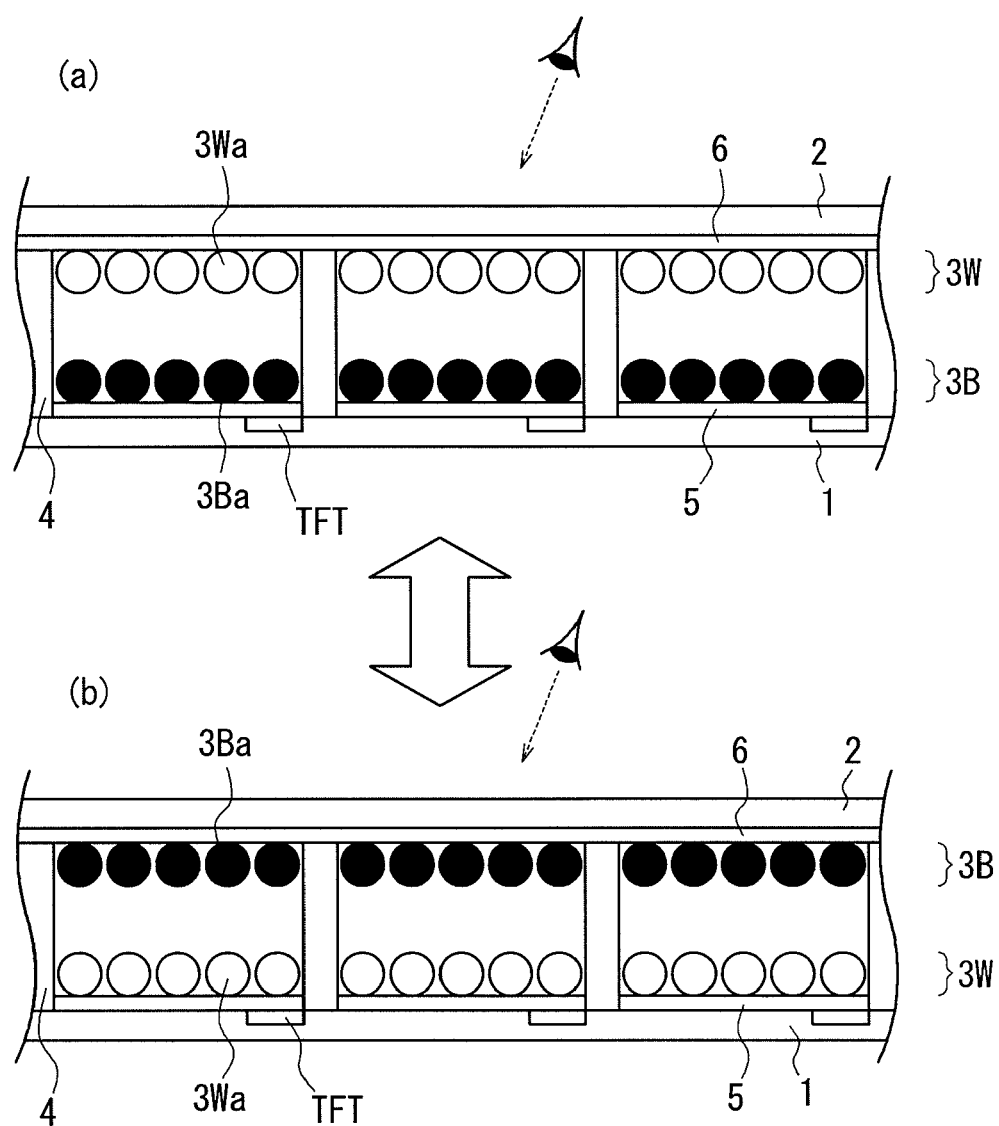
FIGS. 1*a* and 1*b* are diagrams illustrating a fundamental configuration of an information display panel of a charged particles moving method as an object of the present invention.
Figure 2:
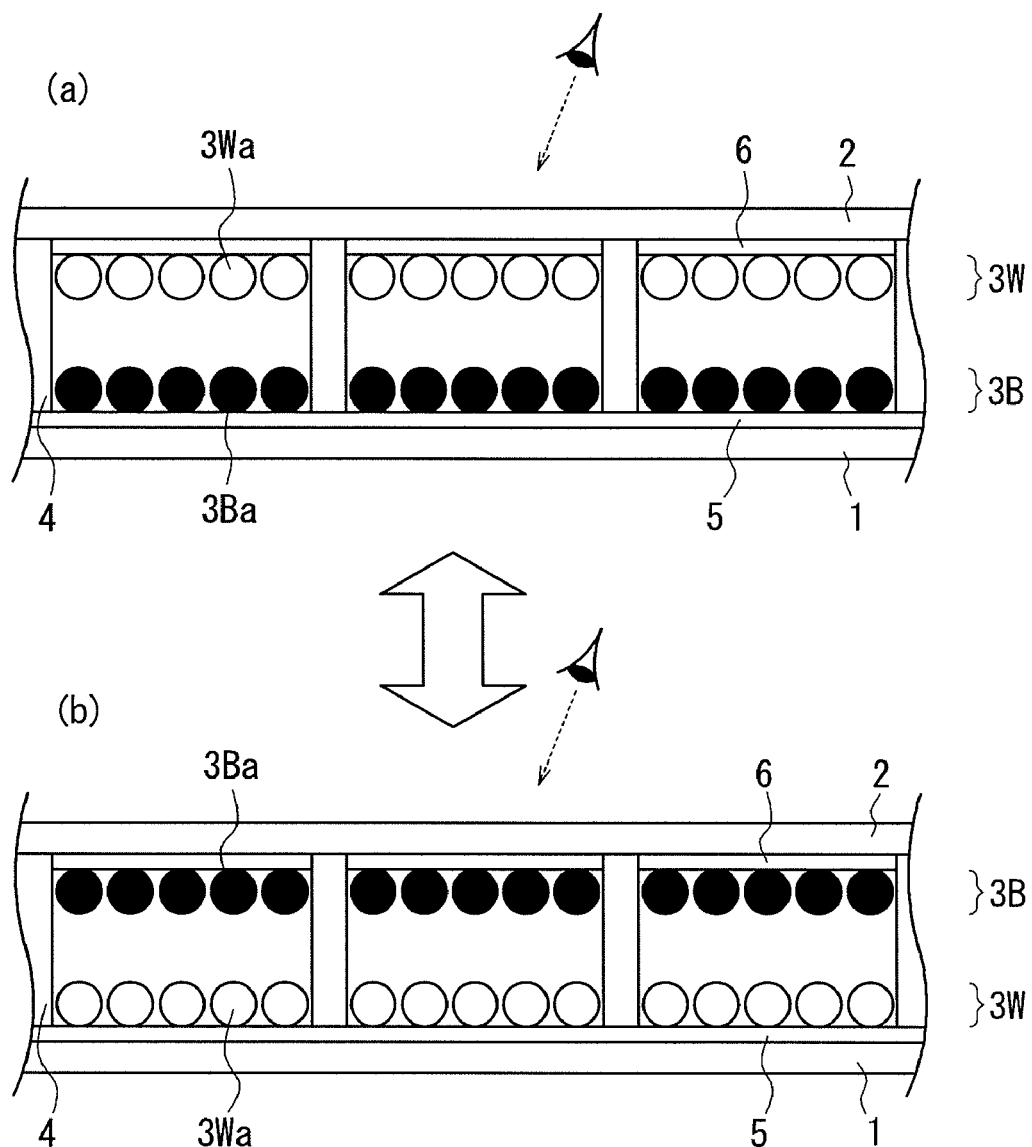
FIGS. 2a and 2b are diagrams illustrating another fundamental configuration of the information display panel of the charged particles moving method as the object of the present invention.
Figure 3:
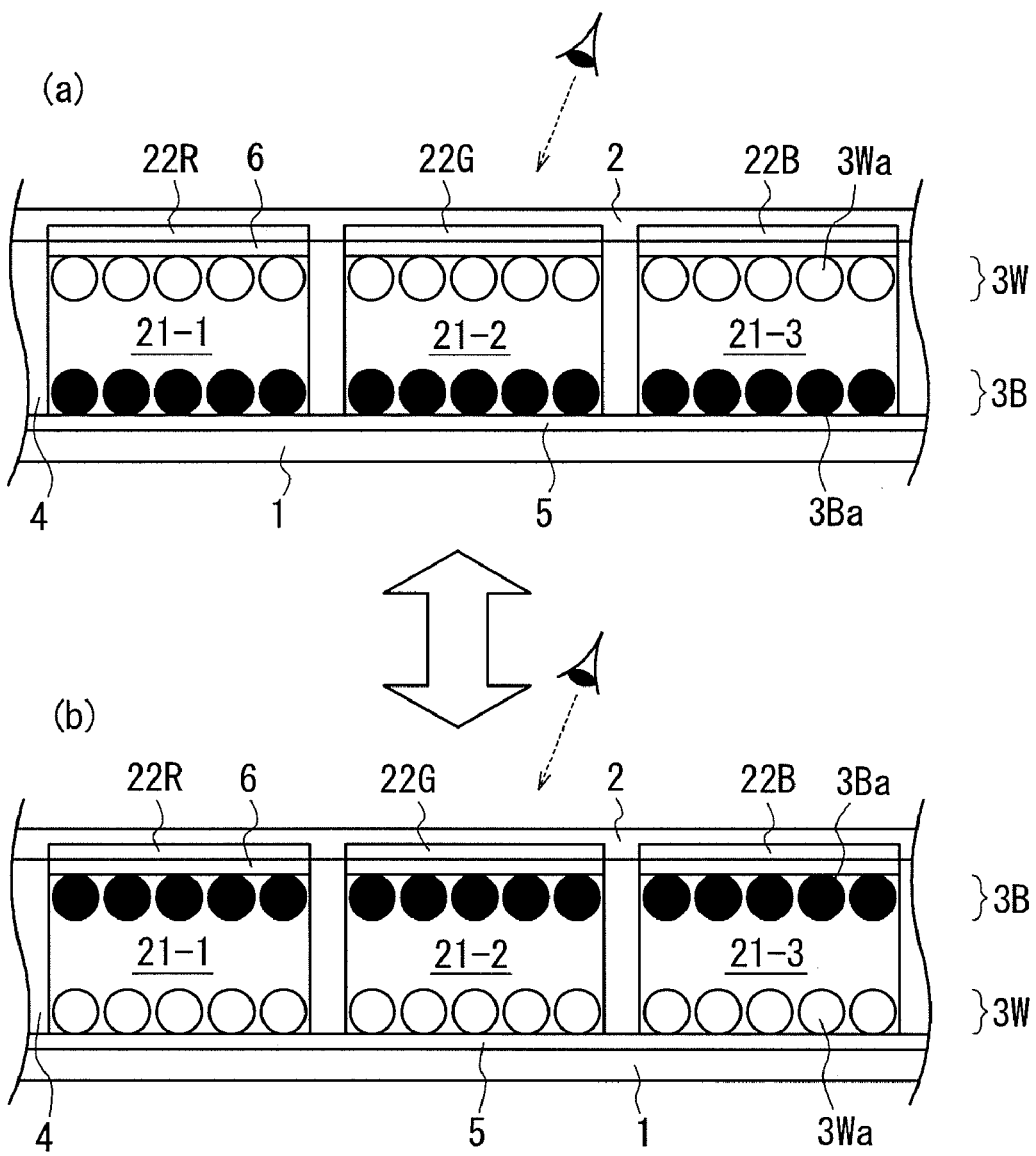
FIGS. 3a and 3b are diagrams illustrating still another fundamental configuration of the information display panel of the charged particles moving method as the object of the present invention.
Figure 4:
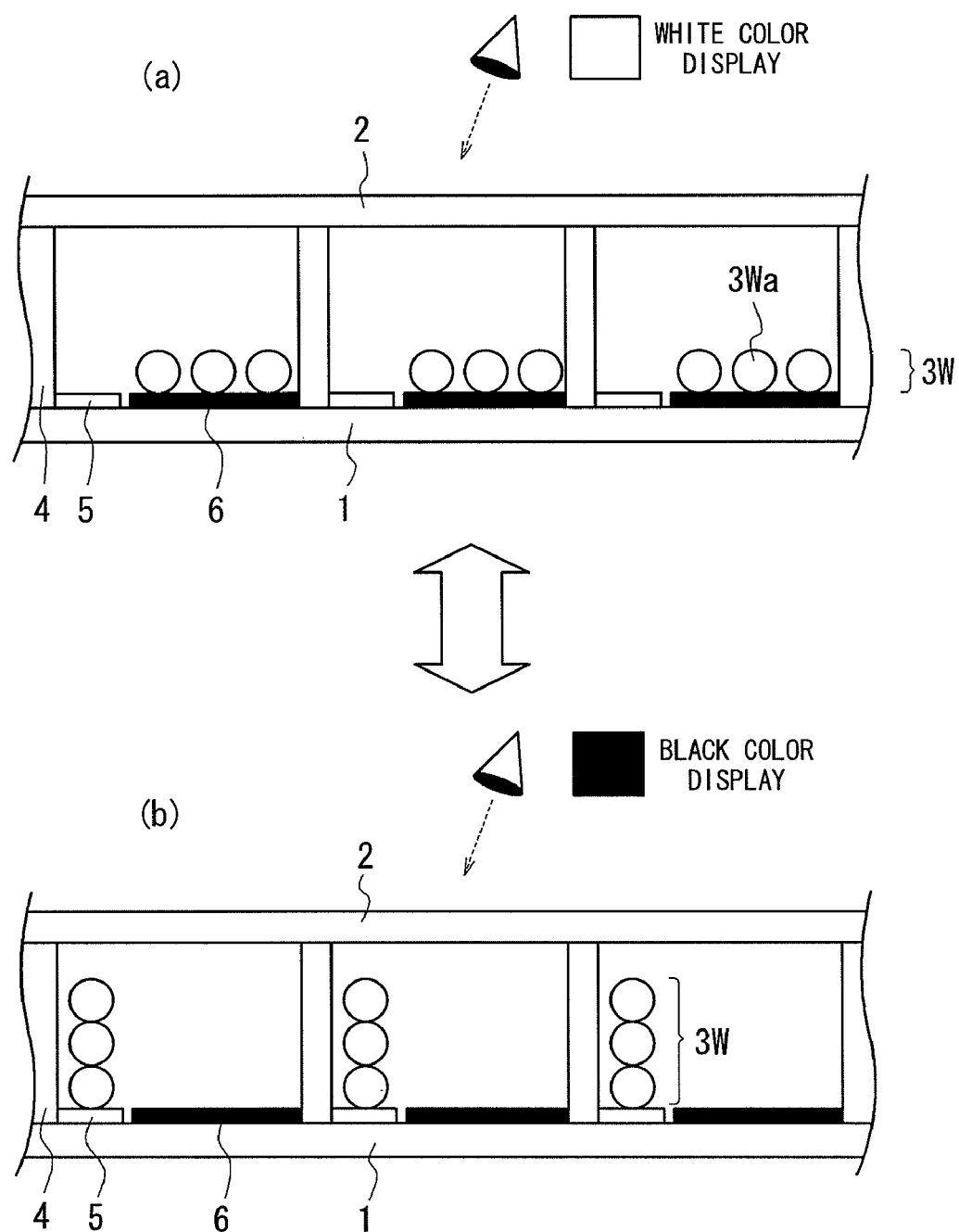
FIGS. 4a and 4b are diagrams illustrating still another fundamental configuration of the information display panel of the charged particles moving method as the object of the present invention.
Figure 5:
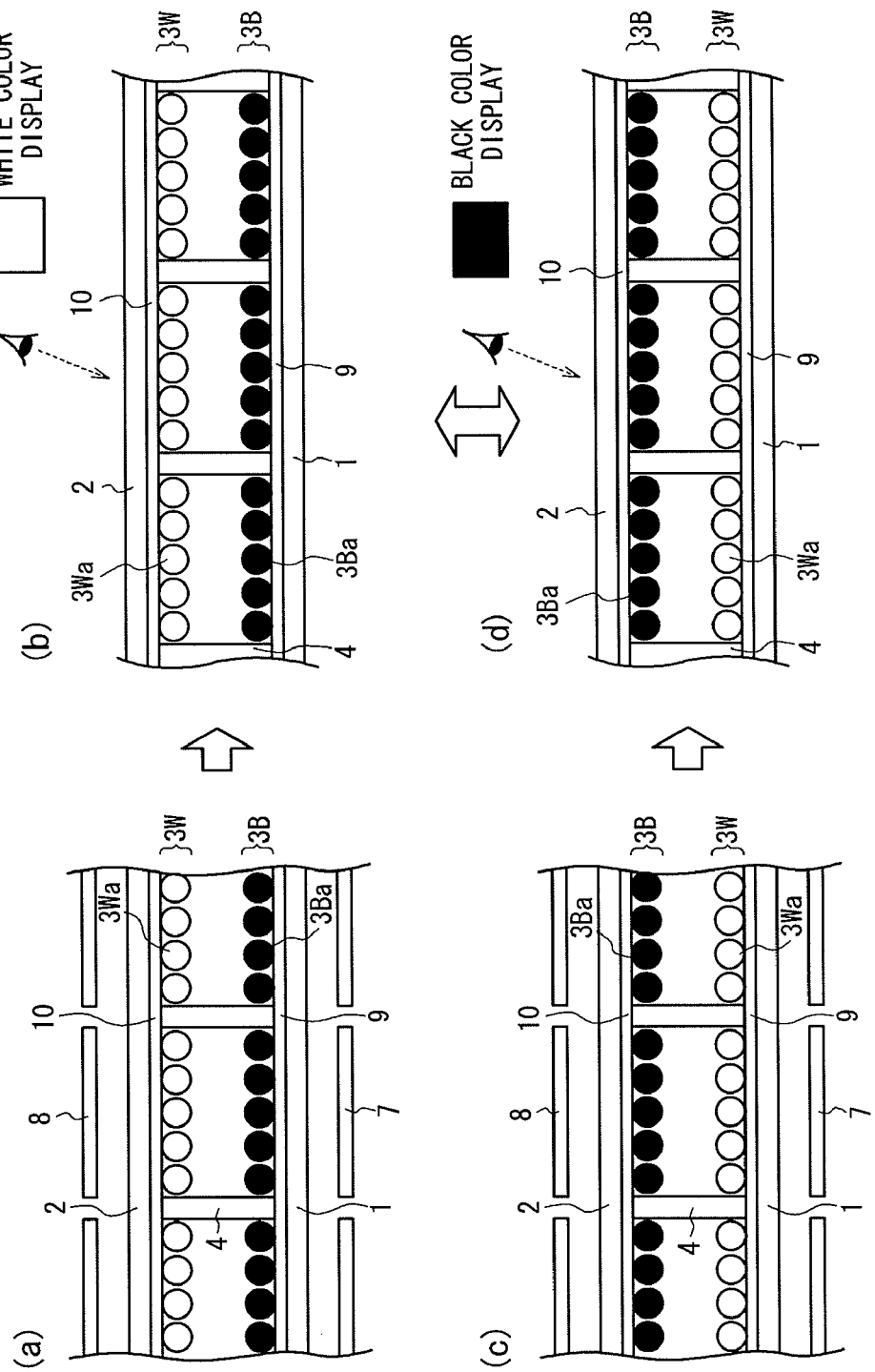
FIGS. 5a to 5d are diagrams illustrating still another fundamental configuration of the information display panel of the charged particles moving method as the object of the present invention.

The following is a detailed description of an embodiment of the present invention based on figures. First, a schematic configuration of an information display panel using particles as display media is described by exemplifying the information display panel which uses display media particles, manufactured as charged particles, as the display media.

In the information display panel, an electric field is applied to the display media constituted of particles including charged display media particles sealed into a space between two opposed substrates. The display media are attracted by a force of the electrostatic field, Coulomb's force, an electrostatic force and the likes along a direction of the electric field applied, and information such as an image is displayed by movements of the display media caused by change of the electric field. Therefore, it is necessary to design the information display panel such that the display media can move uniformly as well as maintaining stability during repetitive rewrite of display or continuous display of the information. Here, forces applied to the display media particles constituting the display media may be an attraction force between the particles due to Coulomb force, an imaging force with respect to the electrodes or substrates, an intermolecular force, a liquid bonding force, gravity and the likes.

Examples of the information display panel coordinating the display media particles according to the present invention as charged particles and using them as the display media are described with reference to FIGS. 1a, 1b to FIGS. 4a, 4b and FIGS. 5a to 5d.

In the example shown in FIGS. 1a and 1b, at least two kinds of display media having different optical reflectance and charge characteristics, composed of particles including the display media particles having at least the optical reflectance and the charge characteristics (here, white color display media 3W comprised of particles including negatively charged white color particles 3Wa and black color display media 3B comprised of particles including positively charged black color particles 3Ba) are moved in each cell formed by partition walls 4 in a perpendicular direction with respect to substrates 1, 2, in accordance with the electric field generated by application of voltage between electrode pairs constituted of an electrode 5 (pixel electrode with TFT) provided to the substrate 1 and an electrode 6 (common electrode) provided to the substrate 2. It thereby performs a matrix display with black and white dots, such as a white color display by having an observer view the white color display media 3W as shown in FIG. 1a or a black color display by having the observer view the black color display media 3B as shown in FIG. 1b.

It is to be noted the partition walls 4 at a front side are not shown in FIGS. 1a and 1b. Each of the electrodes 5, 6 may be provided either outside or inside the substrates 1, 2, or embedded inside the substrates.

In the example shown in FIGS. 2a and 2b, at least two kinds of display media having different optical reflectance and charge characteristics, composed of particles including the display media particles having at least the optical reflectance and the charge characteristics (here, the white color display media 3W comprised of the particles including the negatively charged white color particles 3Wa and the black color display media 3B comprised of the particles including the positively charged black color particles 3Ba) are moved in each cell formed by the partition walls 4 in a perpendicular direction with respect to the substrates 1, 2, in accordance with the electric field generated by application of voltage between pixel electrode pairs constituted of the electrode 5 (line electrode) provided to the substrate 1 and the electrode 6 (line electrode) provided to the substrate 2. It thereby performs the matrix display with black and white dots, such as the white color display by having the observer view the white color display media 3W as shown in FIG. 2a or the black color display by having the observer view the black color display media 3B as shown in FIG. 2b.

It is to be noted the partition walls 4 at the front side are not shown in FIGS. 2a and 2b. Each of the electrodes 5, 6 may be provided either outside or inside the substrates 1, 2, or embedded inside the substrates.

FIGS. 3a and 3b show an example of a color display in which three cells constitute a displaying unit (1 dot) and the negatively charged white color display media 3W and the positively charged black color display media 3B are filled as the display media in all cells 21-2 to 21-3. A red color filter 22R, a green color filter 22G and a blue color filter 22B are provided at observer's sides of the first cell 21-1, the second cell 21-2 and the third cell 21-3, respectively. The displaying unit (1 dot) is constituted of three cells: the first sell 21-1, the second cell 21-2 and the third cell 21-3.

In order to perform the color displays in the present example, the white color display media in one cell of the first cell 21-1 to the third cell 21-3 are moved to the observer's side and simultaneously the black color display media in other cells are moved to the observer's side, so as to perform red, green and blue colors dot displays. In order to perform white color dot display, the white color display media 3W in all of the first cell 21-1 to the third cell 21-3 are moved to the observer's side as shown in FIG. 3a, whereas, in order to perform black color dot display, the black color display media 3B in all of the first cell 21-1 to the third cell 21-3 are moved to the observer's side as shown in FIG. 3b. It is to be noted that the partition walls at the front side are not shown in the example shown in FIGS. 3a and 3b. A multi-colors display can be performed by appropriately moving the display media in each cell.

In the example shown in FIGS. 4a and 4b, one kind of the display media (here, the white color display media 3W comprised of the particles containing the negatively charged display media white color particles 3Wa) constituting particles including the display media particles having at least the optical reflectance and the charge characteristics are moved in each cell, formed by partition walls 4, in a parallel direction with respect to the substrates 1, 2, in accordance with the electric field generated by application of voltage between the electrode 5 and a black color electrode 6 which are provided to the substrate 1. It thereby performs the matrix display with black and white dots, such as the white color display by having the observer view the white color display media 3W as shown in FIG. 4a or the black color display by having the observer view the black color display media 3B as shown in FIG. 4b. It is to be noted that the partition walls at the front side are not shown in the example in FIGS. 4a and 4b.

Furthermore, in the example shown in FIGS. 5a to 5d, as shown in FIGS. 5a and 5c at first, at least two kinds of the display media (here, the white color display media 3W comprised of the particle containing the negatively charged white color particles 3Wa and the black color display media 3B comprised of the particles containing the positively charged black color particles 3Ba) having different optical reflectance and charge characteristics and constituted of particles including particles having at least the optical reflectance and the charge characteristics are moved in each cell, formed by partition walls 4, in the perpendicular direction with respect to the substrates 1, 2, in accordance with the electric field generated by application of voltage between an external electric field formation means 7 provided outside the substrate 1 and an external electric field formation means 8 provided outside the substrate 2. It thereby performs the matrix display with black and white dots, such as the white color display by having the observer view the white color display media 3W as shown in FIG. 5b or the black color display by having the observer view the black color display media 3B as shown in FIG. 5d. It is to be noted that the partition walls at the front side are not shown in the example shown in FIGS. 5a to 5d. In addition, a conductive member 9 and a conductive member 10 are provided inside the substrate 1 and inside the substrate 2, respectively. However, those conductive members can be omitted.

Next, the display media particles, feature of the present invention, are described in detail with reference to figures. The display media particles of the present invention are applicable to the information display panels shown in FIGS. 1a, 1b to FIGS. 5a to 5b, and constitute the display media and sealed between two substrates of the information display panel, at least one of which is transparent.

FIGS. 6a and 6b are schematic diagrams of an example of the display media particle. These media particles are compound particles in which the child particles are added to the surface of the mother particle. FIG. 6a shows an example of a configuration of the compound particle in which the child particles 33 are fixed to the surface of the mother particle 32, whereas FIG. 6b shows an example of the configuration of the compound particle in which the child particles 33 are attached to the surface of the mother particle 32.

The present invention intends to effectively obtain the display media particles in which the child particles are added to the surface of the mother particle evenly, regardless of by either "fixing" or "attaching". The information display panel using the display media particles 31 in which the child particles are evenly arranged on the surface of the mother particle as shown in FIG. 6 can improve durability for repetitive rewrite.

In addition, "attaching" means that the child particles 33 are secured to the surface of the mother particle 32 by electrostatic force, Coulomb force or Van der Waals' forces and thus can move at repetitive rewrite. In contrast, "fixing" means that the child particles 33 are fixed to the surface of the mother particle 32 by burying, adhering or viscous attaching and thus cannot move at repetitive rewrite.

The inventors of the present invention found out that a heat treatment to round the mother particle is effective in order to add the child particles to the surface of the mother particle 32 evenly, as shown in FIGS. 6a and 6b and, moreover, the base resin of predetermined conditions for the mother particle enables rounding of the mother particle more certainly. In particular, as the base resin of the mother particle, by using the thermoplastic resin whose viscosity is no more than 1000 Pa·s at temperature of 260° C. and the shear velocity of $122\ s^{-1}$ and the heatproof temperature, defined as a temperature when the weight becomes 20% minus from the initial weight indicated by the thermal weight reduction curve by the thermogravimetry, is 430° C. or higher, it is possible to round the mother particle effectively by the heat treatment as a post-treatment after manufacture of the mother particle.

Figure 7:
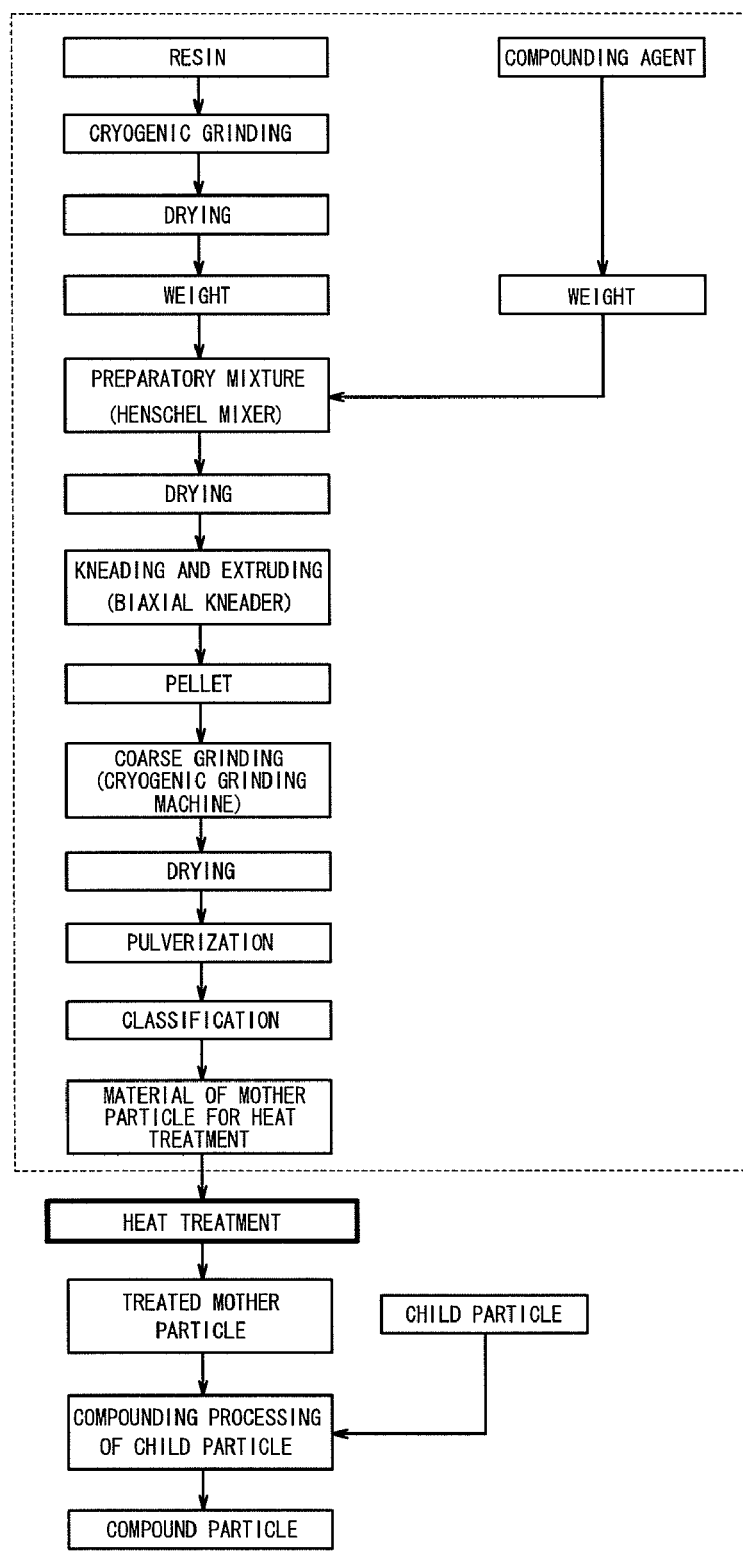
FIG. 7 is a process block diagram illustrating a manufacturing process of the display media particle in a step-by-step manner according to an embodiment of the present invention.

FIG. 7 shows a process block diagram illustrating a manufacturing process of the display media particles in a step by step manner according to the embodiment of the present invention. An outline of the manufacturing process of the display media particles is described following the figure.

A resin of a predetermined material (base resin) is prepared for manufacturing the mother particle. As the base resin, it is preferred to use the thermoplastic resin whose viscosity is no more than 1000 Pa·s at temperature of 260° C. and the shear velocity of $122\ s^{-1}$ and the heatproof temperature, defined as the temperature when the weight becomes 20% minus from the initial weight indicated by the thermal weight reduction curve by the thermogravimetry, is 430° C. or higher. Using a resin satisfying such conditions enables to round the mother particles by the heat treatment (referred to also as "surfusing process") to the surface of the mother particles as stated below.

First, the base resin is grinded by a cryogenic grinding machine, and then dried and weighed. In parallel to this process, a compounding agent (titanium dioxide, $TiO_2$, for example) to be mixed in the base resin is prepared and weighed. The base resin and the compounding agent both after being weighed are preliminarily mixed with each other by a Henschel mixer and dried, then kneaded and extruded by a biaxial kneader into a pellet of 2 mm in diameter and 5 mm in length.

The pellet is further grinded by the cryogenic grinding machine into coarsely grinded particles of about 100 μm-250 μm in particle diameter, for example. After being dried, the coarsely grinded particles are finely grinded into fine particles of about 8 μm-10 μm in particle diameter and then classified, thus the mother particles in an intended size are obtained. Processing performed so far (in a dashed box shown in FIG. 7) is the same as those usually employed to obtain the mother particles by kneading, grinding and classifying a material resin.

Then, the mother particles obtained in the above manner are further processed by a heat treatment apparatus. This heat treatment apparatus ejects the particles into hot air to disperse the particles so as to melt in the hot air and round by their own surface tension. The mother particles having been processed by such heat treatment (surfusing process) enables smooth progress of self-organization arrangement (Ordered Mixture) of the child particles when the child particles are attached (at a child particles compounding process) and the child particles may be evenly arranged and attached on the surfaces of the mother particle. Thereby, it is possible to manufacture the compound particles in a desired shape in which the child particles are evenly arranged and attached to the surface of the mother particle by a child particle compounding processing.

By using the particles including the display media particles according to the present invention described above are used as the display media, it is possible to obtain the information display panel with significantly improved stability of electric characteristics and durability for repetitive rewrite.

The following is a description of each member constituting the information display panel which uses the display media particles according to the present invention.

As for the substrates, at least one of the substrates is a transparent substrate such that a color of the display media can be observed from outside of the panel, and preferably made of a material having a high transmission factor of visible light and an excellent heat resistance. The other substrate, which is used as the substrate at the rear side, may be either transparent or opaque. Materials for the substrate may be, for example, an organic polymer such as polyethylene terephthalate (PET), polyethylene naphthalate (PEN), polyethylene (PE), polycarbonate (PC), polyimide (PI), polyether sulfone (PES) and acryl, and a glass sheet, a quartz sheet and a metallic sheet. Among them, a transparent material is used for the substrate at a display side. A thickness of the substrate is preferably 2 µm to 2000 µm, more preferably 5 µm to 1000 µm. It becomes difficult for the substrate to maintain strength and distance uniformity between the substrates when it is too thin, whereas the substrate is inexpedient to be used for a slim information display panel when it is thicker than 2000 µm.

As materials for the electrode provided to the substrate as necessary, it is suitably selected from, for example, metals such as aluminum, silver, nickel, copper, gold and the likes, conductive metal oxides such as indium tin oxide (ITO), zinc-toped indium tin oxide (IZO), Al-doped zinc oxide (AZO), indium oxide, conductive tin oxide, antimony tin oxide (ATO), conductive zinc oxide and the likes, and conductive polymers such as polyaniline, polypyrrole, polythiophene and the likes. As a method to form the electrode, it may adopt a method to form a thin film from the above materials by a sputtering method, a vacuum vapor deposition method, CVD (chemical vapor deposition) method, an application method and the likes, or a method to laminate a metallic foil (for example, the rolled copper foil), or a method to mix conductive agents with solvents and synthetic resin binder and apply the mixture thereof.

Although the electrode provided to an information display screen area of the substrate at an observation side (display side) needs to be transparent, the electrode provided to other areas and the substrate at the rear side is not required to be transparent. In both cases, the above materials which are conductive and have a pattern formation capability can be suitably used. In addition, the thickness of the electrode provided to the information display screen area of the substrate at the observation side is not particularly limited as long as maintaining electro-conductivity and uninterrupted transparency, which is between 0.01 µm to 10 µm, and preferably 0.05 µm to 5 µm. Although the electrodes provided to the other areas and the substrate at the rear side are the same material and have the same thickness as those of the electrode provided to the substrate at the display side, they do not need to be transparent.

A shape of the partition walls provided to the substrate is not particularly limited but optimally determined in accordance with a kind of the display media for displaying, as well as forms and locations of the electrodes. However, a width of the partition walls is preferably 2 µm-100 µm and more preferably 3 µm-50 µm. A height of the partition walls is adjusted to be within a distance of a gap between the substrates, that is, the height of the partition walls at a part for maintaining a gap between the substrates is adjusted to be the same as a distance of the gap, whereas the height of the partition walls at other parts for forming the cells may be the same as the distance of the gap or lower. In addition, a method of forming the partition walls may be a double rib method in which ribs are formed on each of the opposed substrates 1, 2 and joined to one another or a single rib method in which the ribs are formed on one of the opposed substrates only. Both of the methods are suitably applicable to the present invention. Although the height of the partition walls is adjusted to the distance between the substrates, it is also possible to arrange such that the partition walls are partially lower than the distance.

Figure 8:
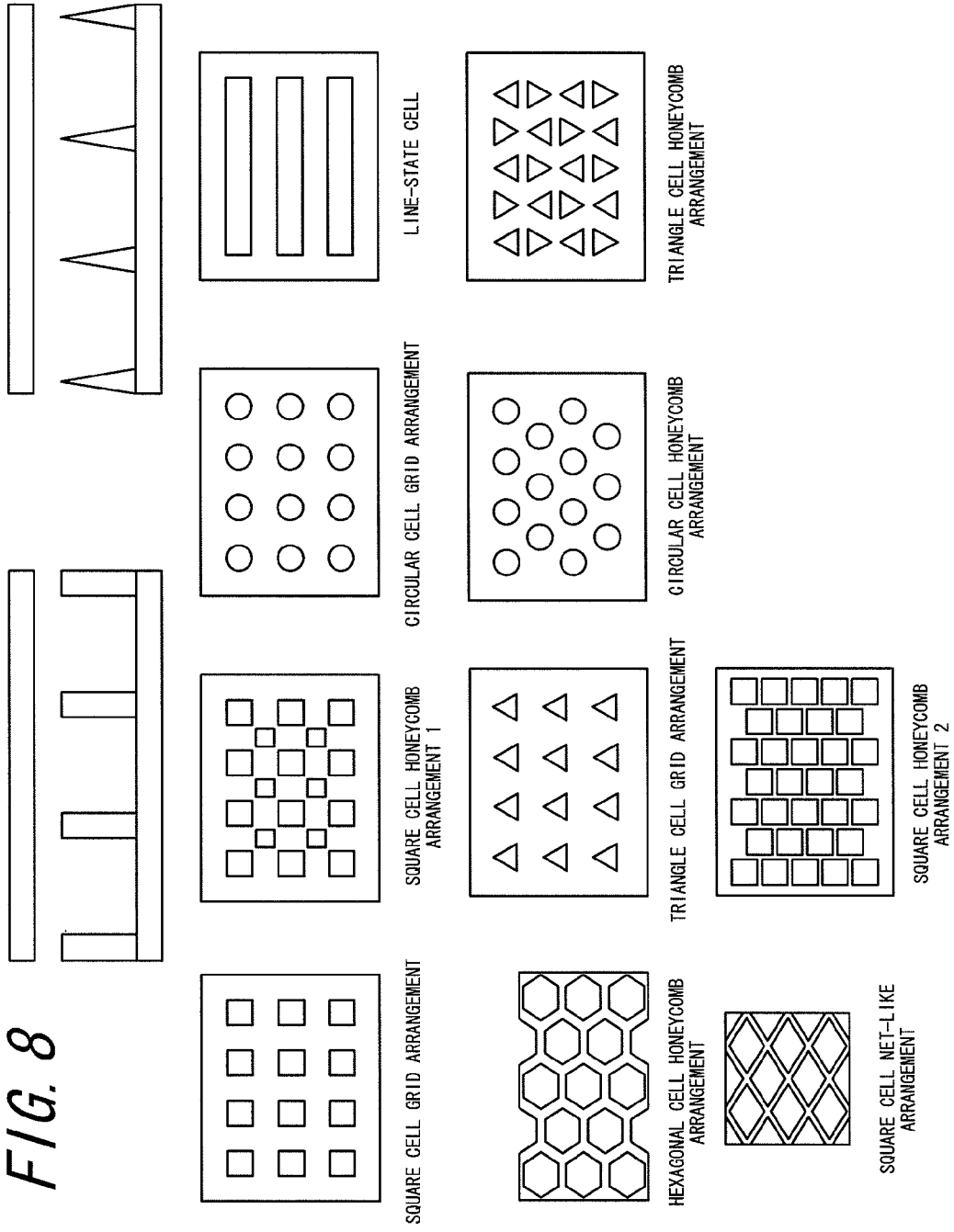
FIG. 8 is a diagram illustrating examples of shapes of partition walls of an information display panel as the object of the present invention.

A shape of the cells formed by the partition walls constituted of the ribs may be, for example, square, triangle, line-state, circle, hexagonal and so on when viewed from a planar direction of the substrate, as shown in FIG. 8, and may be arranged in a grid pattern, a honeycomb pattern and a net-like pattern, for example. It is preferred to minimize a cross-sectional part of the partition walls observable from the display side (dimension of a frame of the cell), for the sake of improvement in sharpness of the display.

A method of forming the partition wall are, for example, a die transfer method, a screen-printing method, a sandblast method, a photolithography method or an additive method. Although any of those methods may be preferably used for the information display panel mounted on the information display device of the present invention, the photolithography method using a resist film and the die transfer method are more preferable.

According to the present invention, charge control agents, coloring agent, inorganic additives and the likes may be contained in the resin for the main component of the mother particle, as necessary. The followings are examples of resin, charge control agent, coloring agent and other additives.

As a precursor of the display media particles, material of the mother particles for heat treatment is generally manufactured by kneading and grinding. Hence, it is necessary that the resin for a main component of the display media particles has thermoplasticity and grindability. In this light, it is preferably to use methacryl resin, polystyrene resin, polycarbonate resin, methylpentene resin, or cycloolefine polymer resin, among a number of kinds of resins commercially offered as the thermoplastic resin. Two or more of these resins may be mixed with each other or with other thermoplastic resins.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

In regard to a coloring agent, various kinds of organic or inorganic pigments or dye exemplified below are employable. Examples of black pigments include carbon black, copper oxide, manganese dioxide, aniline black, and activate carbon.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indanthrene blue BC. Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, tartrazinelake, and C.I. pigment yellow 12. Examples of green pigments include chrome green, chromium oxide, pigment green B, C.I. pigment green 7, Malachite green lake, and final yellow green G. Examples of orange pigments include red chrome yellow, molybdenum orange, permanent orange GTR, pyrazolone orange, Balkan orange, Indanthrene brilliant orange RK, benzidine orange G, Indanthrene brilliant orange GK, and C.I. pigment orange 31. Examples of purple pigments include manganese purple, first violet B, and methyl violet lake. Examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Pressian blue, Armenian blue, cobalt blue, cobalt green, cobalt violet, ion oxide, carbon black, manganese ferrite black, cobalt ferrite black, copper powder, aluminum powder.

These coloring agents and inorganic additives may be used alone or in combination of two or more kinds thereof. Particularly, carbon black is preferable as the black coloring agent, and titanium oxide is preferable as the white coloring agent. The particles for display media having a desired color can be produced by mixing the coloring agents mentioned above.

Moreover, it is preferred that the display media particles of the present invention are evenly shaped having the average particle diameter d(0.5) in a range of 1 μm-20 μm. The image clearness is deteriorated if the average particle diameter d(0.5) is greater than this range, whereas an agglutination force between the particles becomes so large that it interferes with movements of the display media if the average particle diameter is smaller than this range.

Moreover, in regard to a particle diameter distribution of each display medium particle according to the present invention, a particle diameter distribution, Span, defined by the following formula is less than 5, preferably less than 3.

$$\mathrm{Span}=(d(0.9)-d(0.1))/d(0.5)$$

(Here, d(0.5) is a value of the particle diameter expressed by μm in which an amount of the particles having the particle diameter larger than or smaller than this value is 50%, d(0.1) is a value of the particle diameter expressed by μm in which an amount of the particles having the particle diameter smaller than this value is 10%, and d(0.9) is a value of the particle diameter expressed by μm in which an amount of the particles having the particle diameter smaller than this value is 90%.)

Setting the Span 5 or less makes the particle diameters equal in size and uniform movements of the particles.

Furthermore, for the information display panel using two kinds of the display media containing two kinds of display media particles having different charging properties, it is important that, as to the two kinds of the display media particles, a ratio of d(0.5) of the display media particles having a smallest diameter with respect to d(0.5) of the display media particles having a largest diameter is 10 or less. The particles having different charge characteristics move reversely even if the particle diameter distribution Span is made smaller. Therefore, this is a preferred range where the particles are approximately equal in size and can easily move in opposite directions.

It is to be noted that, the particle diameter distribution and the particle diameter of the display media particle can be measured by means of a laser diffraction/scattering method. When a laser light is emitted at the particles to be measured, a light intensity distribution pattern due to a diffraction/scattering light occurs spatially. Since this light intensity distribution pattern corresponds to the particle diameter, it is possible to measure the particle diameter and the particle diameter distribution.

The particle diameter and the particle diameter distribution according to the present invention are obtained by a volume standard distribution. In particular, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

Moreover, for the information display panel which drives the display media composed of the display media particles in a space filled with a gas, it is important to control the gas in the space surrounding the display media between the substrates, as it contributes to an improvement in display stability. In particular, it is important to control such that a relative humidity of the gas in the gap is 60% RH or less at 25° C., preferably 50% RH or less.

The gap described above indicates the gas in contact with the display media, which is a section between the substrates 1, 2 opposed to one another except for the electrodes 5, 6 (in a case where the electrodes are provided inside the substrates), a part occupied by the display media 3W, 3B, a part occupied by the partition walls 4 and a sealing part of the information display panel, in FIGS. 1a and 1b to FIGS. 4a and 4b, and FIGS. 5a to 5d. Although a kind of the gas in the gap is not limited to as long as its humidity is within the above range, it is preferably dry air, dry nitrogen gas, dry argon gas, dry helium gas, dry carbon dioxide gas, dry methane gas and the likes. It is necessary to seal the gas into the information display panel maintaining the humidity. For example, it is essential to fill the display media and assemble the information display panel in an atmosphere with a predetermined humidity and, moreover, to apply a seal agent and a sealing method to prevent a humidity invasion from outside.

Although the space between the substrates of the information display panel using the display media particles according to the present invention is not strictly limited as long as it enables movement of the display media while retaining contrast, it is normally adjusted to 10 μm-500 μm, preferably 10 μm-200 μm. For the information display panel of the charged particles moving method, it is normally adjusted to 10 μm-100 μm, preferably 10 μm-50 μm.

A volume-occupancy of the display media in the gas in the gap between the substrates opposed to one another is preferably 5%-70%, more preferably 5%-60%. When the volume-occupancy is over 70%, it interferes with movement of the display media, whereas the contrast becomes unclear when the volume-occupancy is less than 5%.

The following is a description of compound display media particles manufactured according to embodiments of the present invention, however, the present invention is not limited to the embodiments below.

EMBODIMENTS

Embodiments 1-3, Comparative Examples 1-2

Four kinds of cycloolefin polymer resins prepared as the base resin of the mother particle were a cycloolefin polymer resin A (TOPAS 6013: product of Polyplastics Co., Ltd.), a cycloolefin polymer resin B (TOPAS 5013: product of Polyplastics Co., Ltd.), which is a copolymer of ethylene and cycloolefin, a cycloolefin polymer resin C (ZEONEX 330R: product of Zeon Corporation), which is a homopolymer of cycloolefin, and a cycloolefin polymer resin D (TOPAS 6015: product of Polyplastics Co., Ltd.), which is the copolymer of ethylene and cycloolefin.

Table 1 shown below shows resins A-D, compounding agents A, B, which will be described below, manufacturers of each of machines used for treatments and measurement, names/types and functions of the machines, and conditions.

TABLE 1

| | | |
|---|---|---|
| *1 | Resin A | TOPAS 6013 product of Polyplastics Co., Ltd. |
| | Resin B | TOPAS 5013 product of Polyplastics Co., Ltd. |
| | Resin C | ZEONEX 330R product of Zeon Corporation |
| | Resin D | TOPAS 6015 product of Polyplastics Co., Ltd. |
| | Compounding Agent A | CR90 (TiO$_2$) product of Ishihara Sangyo Co., Ltd. |
| | Compounding Agent B | Special Black 4 product of Evonik Deggusa Japan Co., Ltd. |
| *2 | Manufacturer | Toyo Seiki Seisaku-Sho, Ltd. |
| | Name/Type | Capirograph 1D |
| | Temperature Measured | 260° C. |
| | Shear Velocity | 122 s$^{-1}$ |
| *3 | Manufacturer | TA Instruments. Japan. |
| | Name/Type | TGA Q600 |
| | Airflow | 100 mL/min |
| | Rate of Temperature Rise | 10° C./min |
| *4 | Manufacturer | Nippon Pneumatic Mfg. Co., Ltd. |
| | Name/Type | Meteor-Rainbow MR-10 |
| | Heat Treatment Temperature | 620° C. |
| | Supply Rate | 500 g/hr |
| | Primary Airflow | 50 L/min |
| | Secondary Airflow | 60 L/min |
| *5 | Manufacturer | SYSMEX CORPORATION |
| | Name/Type | Flow-Type Particle Image Analysis Apparatus FPIA-2000 |
| | Measuring Condition | Disperse in 1% of Sodium Dodecyl Sulfate Solution |

Then, as shown in a table (2-1) shown below, an embodiment 1, an embodiment 2 and an embodiment 3 uses the resin A, the resin B, and a mixture of the resin A and the resin D at a ratio by weight of (the resin A/the resin D=10/90), respectively. It is preferred that the resin used here has the viscosity of no more than 1000 Pa·s at 260° C. and the shear rate at 122 s$^{-1}$, and the heatproof temperature at no less than 430° C. According to such conditions, the resins A, B and the resin A/resin D are employed in the embodiments 1-3.

TABLE (2-1)

| | | | Bare Resin | | | | |
|---|---|---|---|---|---|---|---|
| | | Kind of Resin | Product Name | Embodiment 1 | Embodiment 2 | Embodiment 3 | Comparative Example 1 | Comparative Example 2 |
| Composition (pts. wt.) (By *1 in Table 1) | Resin A | TOPAS 6013 | 100 | — | 10 | — | — |
| | Resin B | TOPAS 5013 | — | 100 | — | — | — |
| | Resin C | ZEONEX 330R | — | — | — | — | 100 |
| | Resin D | TOPAS 6015 | — | — | 90 | 100 | — |

TABLE (2-1)-continued

| | | Bare Resin | | | | |
|---|---|---|---|---|---|---|
| Kind of Resin | Product Name | | Embodiment 1 | Embodiment 2 | Embodiment 3 | Comparative Example 1 | Comparative Example 2 |
| (By *2 in Table 1) Viscosity of Resin | [Pa·s] | 653 | 260 | 1000 | 1100 | 531 |
| (By *3 in Table 1) Heatproof TEMP of Resin | [° C.] | 460 | 460 | 465 | 470 | 400 |

The viscosity of the base resin of the mother particle was measured by a viscosity measuring apparatus "Capirograph" (Toyo Seiki Seisaku-Sho, Ltd.) under conditions shown by (*2) in Table 1. In addition, the heatproof temperature thereof was measured by a thermogravimetry unit "TGA Q600" (TA Instruments. Japan.) under conditions shown by (*3) in Table 1. The heatproof temperature of the resin was defined as a temperature where a TGA curve (relationship between the temperature and weight loss) indicates 20% minus from an initial weight.

In regard to the mixture of the resin A and the resin D in the embodiment 3, pellets were manufactured by using a biaxial kneader, which is a usual blending manner, and then and particle sizes and the heatproof temperatures thereof were measured.

A comparative example 1 in which the condition of the viscosity (less than 1000 Pa·s) was not satisfied and a competitive example 2 in which the condition of the heatproof temperature (430° C. or higher) was not satisfied were prepared in contrast to the above embodiments.

Furthermore, the following embodiments and the comparative examples were demonstrated.

Embodiments 4-6, Comparative Examples 3-4

White Mother Particles

In order to manufacture the white mother particles, as shown in Table (2-2) below, the base resin of 100 pts.wt. in Table (2-1) and titanium dioxide (TiO2) (Tipaque CR-90: Ishihara Sangyo Kaisya, Ltd.) of 100 pts.wt. as the compounding agent A were melt and kneaded by the biaxial kneader so as to obtain pellets as coarsely grinded particles, and then the coarsely grinded particles were further grinded into fine particles and classified so as to have the average particle diameter d(0.5) as 9 μm.

TABLE 2-2

| | | | White Mother Particle | | | | |
|---|---|---|---|---|---|---|---|
| | Kind of Resin | Product Name | Embodiment 4 | Embodiment 5 | Embodiment 6 | Comparative Example 3 | Comparative Example 4 |
| Composition (pts. wt.) | Resin A | TOPAS 6013 | 100 | — | 10 | — | — |
| | Resin B | TOPAS 5013 | — | 100 | — | — | — |
| | Resin C | ZEONEX 330R | — | — | — | — | 100 |
| | Resin D | TOPAS 6015 | — | — | 90 | 100 | — |
| | Compounding Agent A | TIPAQUE CR-90 | 100 | 100 | 100 | 100 | 100 |
| Average Diameter of Classified Particles | d (0.5) | [μm] | 9.06 | 8.95 | 9.00 | 9.01 | 8.93 |
| | Span | [—] | 0.72 | 0.72 | 0.72 | 0.72 | 0.71 |
| (By *5 in Table 1) Circularity | Parameter | [—] | 0.984 | 0.987 | 0.980 | 0.950 | 0.986 |
| | Evaluation (*a) | | ○ | ○ | ○ | X | ○ |
| Deterioration of Resin (*b) | | Discoloration | ○ | ○ | ○ | ○ | X |
| | | Viscosity | ○ | ○ | ○ | ○ | X |

(*a) It is necessary to have at least 0.98 of circularity for smooth compounding with the child particles and immobilization thereof.

(*b) Discoloration is determined visually. ○: Almost No Discoloration, X: Discolored Viscosity is determined by finger contact. ○: Almost No Viscosity, X: Viscous Embodiments 7-9, Comparative Examples 5-6

Black Mother Particles

In order to manufacture the black mother particles, as shown in Table (2-3) below, the base resin of 100 pts.wt. in Table (2-1) and carbon black (C/B) (Special Black 4: Evonik Deggusa Japan Co., Ltd.) of 5 pts.wt. as the compounding agent B were melt and kneaded by the biaxial kneader so as to obtain pellets as coarsely grinded particles, and then, in the same manner as the white mother particles, the coarsely grinded particles were further grinded into fine particles and classified so as to have the average particle diameter d(0.5) as 9 μm.

contrasts and durability thereof were evaluated. Results of the evaluations are shown in the Table (2-4) below.

1) Positively Charged Child Particles

Fine particles of commercial melamine resin (EPOSTER-S: NIPPON SHOKUBAI CO., LTD, an average particle diameter is 240 [nm]) were used as positively charged child particles.

2) Negatively Charged Child Particles

Polydivinyl benzene particles (hereinafter, referred to also as DVB particles) (the average particle diameter is 250 [nm]) of dry powder, manufactured based on a standard emulsion polymerization method and by washing in purified water adequately and evaporating moisture in a vacuum oven, were used as negatively charged child particles.

TABLE 2-3

| | | | Black Mother Particle | | | | |
|---|---|---|---|---|---|---|---|
| | Kind of Resin | Product Name | Embodiment 7 | Embodiment 8 | Embodiment 9 | Comparative Example 5 | Comparative Example 6 |
| Composition (pts. wt.) | Resin A | TOPAS 6013 | 100 | — | 10 | — | — |
| | Resin B | TOPAS 5013 | — | 100 | — | — | — |
| | Resin C | ZEONEX 330R | — | — | — | — | 100 |
| | Resin D | TOPAS 6015 | — | — | 90 | 100 | — |
| | Compounding Agent B | C/B | 5 | 5 | 5 | 5 | 5 |
| Average Diameter of Classified Particles (By *5 in Table 1) | d (0.5) | [μm] | 9.11 | 8.97 | 8.99 | 9.15 | 9.00 |
| | Span | [—] | 0.74 | 0.73 | 0.75 | 0.75 | 0.76 |
| | Parameter Evaluation (*a) | [—] | 0.988 ○ | 0.989 ○ | 0.985 ○ | 0.955 X | 0.987 ○ |
| Circularity Deterioration of Resin (*b) | | Discoloration | ○ | ○ | ○ | ○ | X |
| | | Viscosity | ○ | ○ | ○ | ○ | X |

(*a) It is necessary to have at least 0.98 of circularity for smooth compounding with the child particles and immobilization thereof.
(*b) Discoloration is determined visually. ○: Almost No Discoloration, X: Discolored Viscosity is determined by finger contact. ○: Almost No Viscosity, X: Viscous Circularities and deteriorated condition of the resins of the mother particles in the embodiments 4-9 and the comparative examples 3-6 were evaluated. Results of the evaluations are shown in lower sections of each of the above tables (2-2) and (2-3). The circularity is defined as a value calculated by dividing a boundary length of a circle equivalent to a projected area of the particle by a projected boundary length of the particle, and the circularities of a true circle, a regular hexagon, a regular pentagon, a square, and a regular triangle are 1.000, 0.952, 0.930, 0.886 and 0.777, respectively. The circularity of the mother particles was measured by a flow-type particle image analysis apparatus FPIA-2000 (SYSMEX CORPORATION) shown by (*5) in Table 1 and over 0.98, according to the embodiments. Also, it was demonstrated that the mother particles according to the embodiments had no deterioration of the resin caused by heat in the heat treatment for spheronization (suffusion processing with the apparatus and conditions shown in Table 1 (*4)).

Display Media Particles

Furthermore, the display media particles using the mother particles according to the above embodiments 4-9 and the comparative examples 3-6 were manufactured as described below and sealed between the substrates of the panel, so as to manufacture the information display panel of the embodiments 10, 11, 12 and the comparative examples 7, 8, and then 3) Manufacture of the Display Media Particles and a Combination of the Mother Particle and the Child Particles The mother particle and the child particles were attached and compounded by a compounding machine described below. A combination of the mother particle and the child particles may be, for example, (black color positively charged mother particle+melamine resin child particles) and (white color negatively charged mother particles+polydivinyl benzene child particles).

4) Mother particles+Child Particles, Attaching and Compounding Processing

Apparatus: Sample Mill SK-M10 (product of Kyoritsu Riko Co., Ltd.)

Condition: 70° C., 16500 rmp×30-90 minutes

In accordance with a combination shown in Table (2-4), mixed powder (bulk dimensions=apparent dimensions 130 cm³) with a ratio of the mother particles of 100 pts.wt. and the child particles of 8 pts.wt. was put in the above apparatus at once and had a compounding processing under a certain condition, and then sieved by a stainless sieve with meshes of 150 μm, so as to obtain the compound display media particles.

Furthermore, commercial fine silica particles (HDK H3004: Wacker Chemie AG) were attached to surfaces of the compound particles.

5) Silica Fine Particles Attaching Process

Carbon Mixer (product of SMD Corporation)

Condition: 25° C., 4000 rmp×15 minutes

Mixed powder (bulk dimensions=apparent dimensions 200 cm$^3$) of the compound particles and the silica fine particles (HDK H3004: Wacker Chemie AG) at a weight fraction of 2% was put in the above apparatus at once and had attaching processing under the above condition, and then sieved by the stainless sieve with meshes of 150 μm, so as to obtain the particles used as the display media.

6) Evaluation Method of Initial Contrast Ratio

The black color particles and the white color particles of the same amounts were mixed, stirred and processed with frictional electrification, and then filled at a volume occupancy of 30% in a cell between an ITO-processed glass substrate and connected to a power source and a copper substrate which are disposed by a spacer of 10 μm therebetween, so as to obtain a simple information display panel for evaluation.

When each of the ITO glass substrate and the copper substrate was connected to the power source and DC electricity was applied such that a voltage was low at the ITO glass substrate and high at the copper substrate, the positively charged black particles moved to a low potential side, whereas the negatively charged particles moved to a high potential side, the black color display was observed through the glass substrate. Next, when the electricity was applied to reverse the voltage, the particles (display media) moved in opposite directions, the white color display was observed. The voltage from −200 [v] to +200 [v] increasing by 10 [v] was applied and reflectance was measured at each display condition, and a ratio of the reflectance at the white color display to the reflectance at the black color display when absolute values of the voltages were applied was obtained as a contrast ratio at the voltage, whereas the contrast ratio when voltages±200 [v] were applied before evaluation of durability was defined as an initial contrast ratio (initial C200) and an index of sharpness of the display by the particles.

7) Method of Evaluation of Durability

After obtainment of the initial contrast ratio, voltage±200 [v] at a frequency 1 [kHz] were applied 1 million times in turns so as to inverse the display media. Then, the contrast ratio at each voltage was measured in the same manner as described above, so as to obtain the contrast ratio at application of voltage±200 [v] after 1 million times of inversion motions. The contrast ratio was defined as a post-duration test contrast ratio (post-duration C200) and the index of sharpness of the display.

8) Results of Evaluations are in a Table (2-4) Shown Below.

Although preferred embodiments of the present invention are described above in detail, the present invention is not

TABLE (2-4)

Evaluation of Durability of Information Display Panel

|  |  |  | Embodiment 10 | Embodiment 11 | Embodiment 12 | Comparative Example 7 | Comparative Example 8 |
|---|---|---|---|---|---|---|---|
| Display Media Particle | White | Mother Particle | Embodiment 4 | Embodiment 5 | Embodiment 6 | Comparative Example 3 | Comparative Example 4 |
|  |  | Child Particle | Polydivinyl Benzene Fine Particles | | | | |
|  | Black | Mother Particle | Embodiment 7 | Embodiment 8 | Embodiment 9 | Comparative Example 5 | Comparative Example 6 |
|  |  | Child Particle | Melamine Resin Fine Particles | | | | |
| Durability | Initial C200 | | 10.5 | 11.0 | 10.5 | 10.5 | 8.5 |
|  | (Evaluation) | | Excellent | Excellent | Excellent | Excellent | Good |
|  | Post-Duration C200 | | 6.0 | 6.0 | 5.5 | 2.0 | 4.5 |
|  | (Evaluation) | | Good | Good | Good | Bad | Slightly Bad | limited to such particular embodiments but may be varied or altered in a multiple of manners within a scope of claims of the present invention.

INDUSTRIAL APPLICABILITY

The information display panel using the display media particles according to the present invention is suitably applicable to display units for mobile equipment such as notebook personal computers, electric diaries, PDAs (Personal Digital Assistants), cellular phones, handy terminals and so on; display units for electric paper such as electric books, electric newspapers, electric manual (instruction), signboards, posters, bulletin boards such as blackboards and whiteboards, electric calculator, home appliances, auto supplies and so on; card display units such as point cards, IC cards and so on; and the display units for electric advertisements, information boards, electric POPs (Point Of Presence, Point Of Purchase advertising), electric price tags, electric shelf tags, electric musical scores, RF-ID device and so on, as well as displays for a variety of electric equipments such as POS terminals, car navigation systems, clocks and so on. The information display panel according to the present invention is also suitably applicable to a so-called rewritable paper which rewrites the display by using an external electronic field forming means or an external rewrite means only when rewriting the display.

It is to be noted that, as a driving method of the information display panel, there are a variety of applicable driving methods such as a simple matrix driving method and a static driving method that do not use a switching element for the panel itself, an active matrix driving method using a three-terminal switching element represented by a thin-film transistor (TFT) or a two-terminal switching element represented by a thin-film diode (TFD), an external electronic field driving method using an external electronic field forming method, and the likes.

The invention claimed is:

1. A display media particle used for an information display panel having display media constituted of particles sealed between two substrates, at least one of which is transparent, for displaying information by moving the display media, characterized in that the display media particle is formed of a compound particle in which a mother particle formed of a material including a base resin has child particles added to a surface thereof, and wherein the base resin is a thermoplastic resin having a viscosity of no more than 1000 Pa·s at 260° C., a shear rate at 122 $s^{-1}$, and a heatproof temperature at no less than 430° C., and wherein the base resin is a cycloolefin polymer resin.

2. An information display panel characterized in that use is made of the particles including the display media particle according to claim 1 as the display media.

* * * * *